US010004941B2

(12) United States Patent
Wu

(10) Patent No.: US 10,004,941 B2
(45) Date of Patent: Jun. 26, 2018

(54) FITNESS BIKE WITH A BRAKING DEVICE

(71) Applicant: Mu-Chuan Wu, Tainan (TW)

(72) Inventor: Mu-Chuan Wu, Tainan (TW)

(*) Notice: Subject to any disclaimer, the term of this patent is extended or adjusted under 35 U.S.C. 154(b) by 11 days.

(21) Appl. No.: 15/223,744

(22) Filed: Jul. 29, 2016

(65) Prior Publication Data

US 2018/0028858 A1 Feb. 1, 2018

(51) Int. Cl.
*A63B 21/00* (2006.01)
*A63B 22/06* (2006.01)
(Continued)

(52) U.S. Cl.
CPC ...... *A63B 22/0605* (2013.01); *A63B 21/4034* (2015.10); *A63B 23/0476* (2013.01);
(Continued)

(58) Field of Classification Search
CPC ........ A63B 21/00058; A63B 21/00069; A63B 21/00072; A63B 21/00076; A63B 21/00192; A63B 21/005; A63B 21/0056; A63B 21/012; A63B 21/015; A63B 21/02; A63B 21/021; A63B 21/022; A63B 21/023; A63B 21/025; A63B 21/028; A63B 21/04; A63B 21/0407; A63B 21/0414; A63B 21/0421; A63B 21/0428; A63B 21/0435; A63B 21/0442; A63B 21/045; A63B 21/0455; A63B 21/05; A63B 21/15; A63B 21/151; A63B 21/152; A63B 21/154; A63B 21/157; A63B 21/159; A63B 21/22; A63B 21/225; A63B 21/4027; A63B 21/4033; A63B 21/4034; A63B 21/4045; A63B 21/4047; A63B 21/4049; A63B 22/0015; A63B 22/0017; A63B 22/0046; A63B 22/06; A63B 22/0605; A63B 22/0635; A63B 23/035; A63B 23/03516; A63B 23/03533; A63B 23/04; A63B 23/0405; A63B 23/0476; A63B 23/0482;
(Continued)

(56) References Cited

U.S. PATENT DOCUMENTS 3,845,663 A * 11/1974 Blomberg ............... A61B 5/221
476/38
5,586,624 A * 12/1996 Ko ..................... A63B 21/0051
188/164

(Continued)

*Primary Examiner* — Loan H Thanh
*Assistant Examiner* — Gary D Urbiel Goldner
(74) *Attorney, Agent, or Firm* — Withrow & Terranova, P.L.L.C.

(57) ABSTRACT

A fitness bike with a braking device has a frame, a flywheel, an adjusting assembly, a braking assembly, and a wire. The adjusting assembly is mounted on the frame, and has a main housing, a shaft, and a first resilient member. The shaft is movably mounted in the main housing. The first resilient member is located in the main housing and abuts the shaft. The braking assembly is rotatably mounted on the frame and has an abutting element. The abutting element is capable of abutting a radial outer surface of the flywheel. The wire is mounted on the frame and connects the shaft to the braking assembly. The braking assembly abuts and limits the flywheel in one single direction. Thus, the fitness bike with the braking device has a simplified structure and is easy to install.

15 Claims, 5 Drawing Sheets

(51) Int. Cl.
*A63B 23/04* (2006.01)
*F16D 49/00* (2006.01)
*F16D 125/60* (2012.01)
*F16D 121/14* (2012.01)

(52) U.S. Cl.
CPC .......... F16D 49/00 (2013.01); *F16D 2121/14* (2013.01); *F16D 2125/60* (2013.01)

(58) Field of Classification Search
CPC ................ A63B 23/0494; A63B 69/16; A63B 2069/168; A63B 71/0054; A63B 2071/0063; A63B 2071/0072; A63B 2071/0081; A63B 2071/009; A63B 2208/0228; A63B 2208/0233; A63B 2209/00; A63B 2209/08; F16D 49/00; F16D 2121/14; F16D 2125/60
See application file for complete search history.

(56) References Cited

U.S. PATENT DOCUMENTS

| | | | | |
|---|---|---|---|---|
| 6,099,440 A * | 8/2000 | Schurter | .............. | A63B 21/012 482/63 |
| 6,905,445 B1 * | 6/2005 | Lin | .............. | A63B 21/012 188/24.11 |
| 7,004,888 B1 * | 2/2006 | Weng | .............. | A63B 21/0051 482/57 |
| 8,052,581 B1 * | 11/2011 | Lohr | .............. | A63B 21/015 482/63 |
| 8,092,352 B2 * | 1/2012 | Irving | .............. | A63B 21/225 482/57 |
| 8,480,545 B2 * | 7/2013 | Irving | .............. | A63B 21/225 482/57 |
| 9,028,373 B2 * | 5/2015 | Irving | .............. | A63B 21/225 482/57 |
| 9,446,277 B2 * | 9/2016 | Irving | .............. | A63B 21/225 |
| 2002/0151414 A1 * | 10/2002 | Baker | .............. | A63B 22/0605 482/57 |
| 2006/0021830 A1 * | 2/2006 | Lassanske | .............. | A63B 21/153 188/2 D |
| 2006/0234840 A1 * | 10/2006 | Watson | .............. | A63B 24/00 482/61 |
| 2007/0099767 A1 * | 5/2007 | Harashima | .............. | A63B 21/00196 482/57 |
| 2008/0096725 A1 * | 4/2008 | Keiser | .............. | A63B 21/0051 482/8 |
| 2008/0103030 A1 * | 5/2008 | Watson | .............. | A63B 24/00 482/61 |
| 2009/0170667 A1 * | 7/2009 | Irving | .............. | A63B 21/225 482/57 |
| 2010/0234185 A1 * | 9/2010 | Watt | .............. | A63B 21/0051 482/8 |
| 2012/0088638 A1 * | 4/2012 | Lull | .............. | A63B 21/015 482/57 |
| 2012/0108399 A1 * | 5/2012 | Irving | .............. | A63B 21/225 482/57 |
| 2013/0296139 A1 * | 11/2013 | Irving | .............. | A63B 21/225 482/57 |
| 2015/0238797 A1 * | 8/2015 | Irving | .............. | A63B 21/225 482/57 |
| 2016/0153852 A1 * | 6/2016 | Wu | .............. | G01L 3/104 73/862.332 |
| 2016/0263417 A1 * | 9/2016 | Golesh | .............. | A63B 21/00069 |
| 2016/0310785 A1 * | 10/2016 | Lo | .............. | A63B 21/005 |
| 2017/0001065 A1 * | 1/2017 | Irving | .............. | A63B 21/225 |

* cited by examiner

FITNESS BIKE WITH A BRAKING DEVICE

BACKGROUND

Technical Field

The present disclosure relates to a fitness bike with a braking device that has a simplified structure and is easy to install.

Description of the Related Art

A fitness bike is an indoor sports device. The fitness bike may be operated anytime without limitations by the surroundings and the weather. The structure and the operation of the fitness bike are similar to those of a real bike. A difference between the fitness bike and the real bike is that the fitness bike works without change of location. The resistance of the fitness bike is adjustable to simulate the riding of the real bike. The exercise intensity is adjusted by controlling the treading speed and the resistance. Thus, the cardiopulmonary function and the metabolism of the user are improved. However, the fitness bike does not have an independent braking device. The fitness bike increases the resistance that produces a friction on a flywheel of the excise bike. The rotation of the flywheel slows down gradually until stop. However, the rotation of the flywheel may cause an accident. Therefore, the fitness bike needs an improvement on the braking.

Thus, a conventional excise bike has been developed and has a frame, a braking device, and a flywheel. The braking device has a fixed member that is mounted on the frame. A rotating axle is mounted in the bottom of the fixed member. A braking handle is connected to the rotating axle to drive the rotating axle. A pair of clamping plates is connected to the braking handle, and is movably mounted on two side surfaces of the flywheel. Two braking pads are respectively mounted on the inner surfaces of the clamping plates. The pair of the clamping plates that approaches the flywheel is controlled by the braking handle. Thus, the braking pads laterally abut the flywheel and make the flywheel stop. However, the conventional fitness bike has a complicated structure and installation thereof is inconvenient.

SUMMARY

An objective of the present disclosure is to provide a fitness bike with a braking device that has a simplified structure and is easy to install.

To achieve the foregoing objective, the fitness bike with a braking device has a frame, a flywheel, an adjusting assembly, a braking assembly, and a wire. The flywheel is rotatably mounted on the frame. The adjusting assembly is mounted on the frame, and has a main housing, a shaft, and a first resilient member. The main housing is mounted on the frame. The shaft is movably mounted in the main housing. The first resilient member is located in the main housing, receives the shaft and abuts the shaft. The braking assembly is rotatably mounted on the frame, is located next to the flywheel, and has an abutting element. The abutting element is located next to the flywheel, and is capable of abutting a radial outer surface of the flywheel. The wire is mounted on the frame and is connected to the adjusting assembly. One of two ends of the wire is mounted on the shaft, which is mounted in the main housing. The other end of the wire is mounted on the braking assembly.

Other objectives, advantages and novel features of the disclosure will become more apparent from the following detailed description when taken in conjunction with the accompanying drawings.

DETAILED DESCRIPTION

Figure 1:
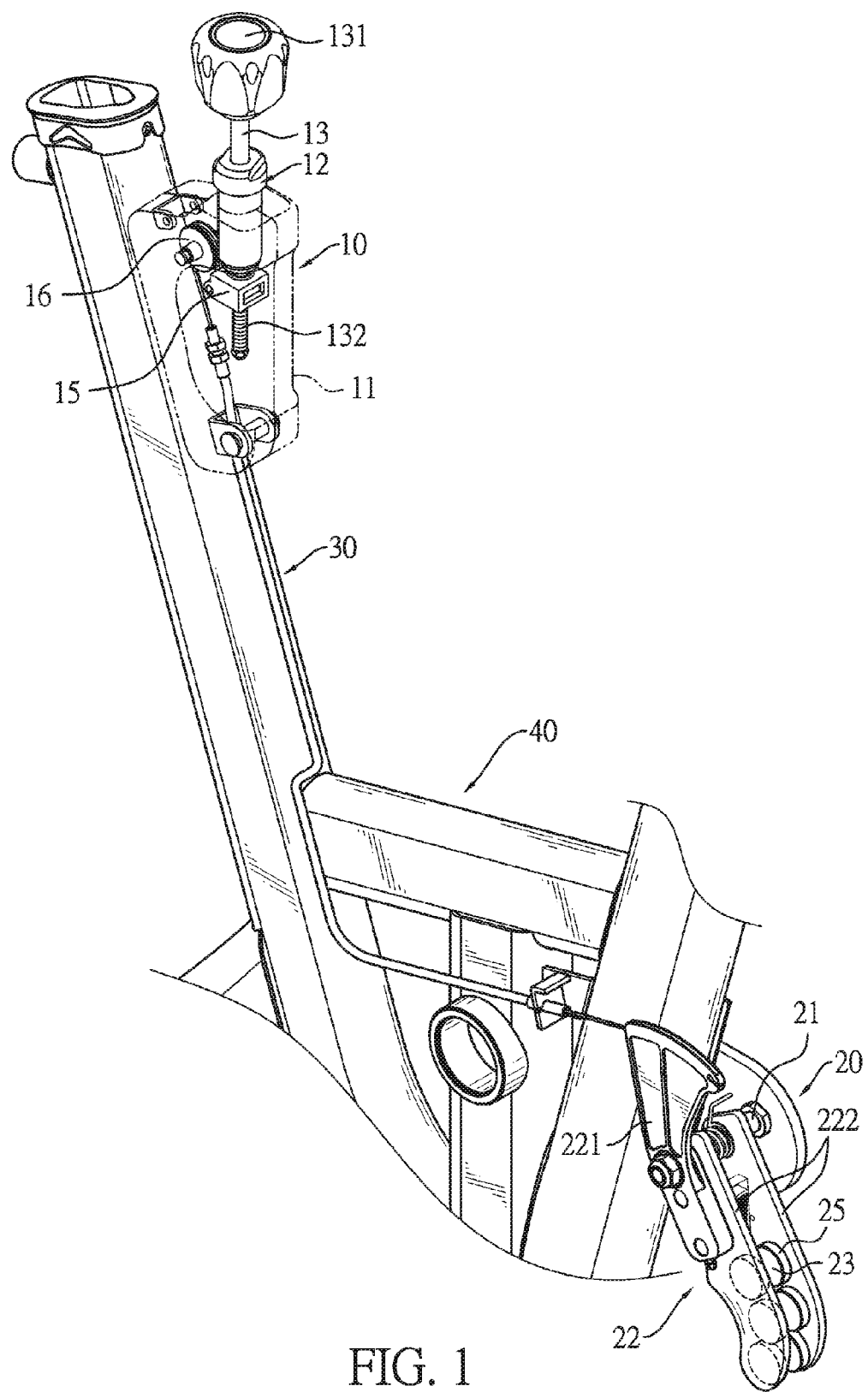
FIG. 1 is a perspective view of a braking device for a fitness bike that is mounted in a frame in accordance with the present disclosure.
Figure 3:
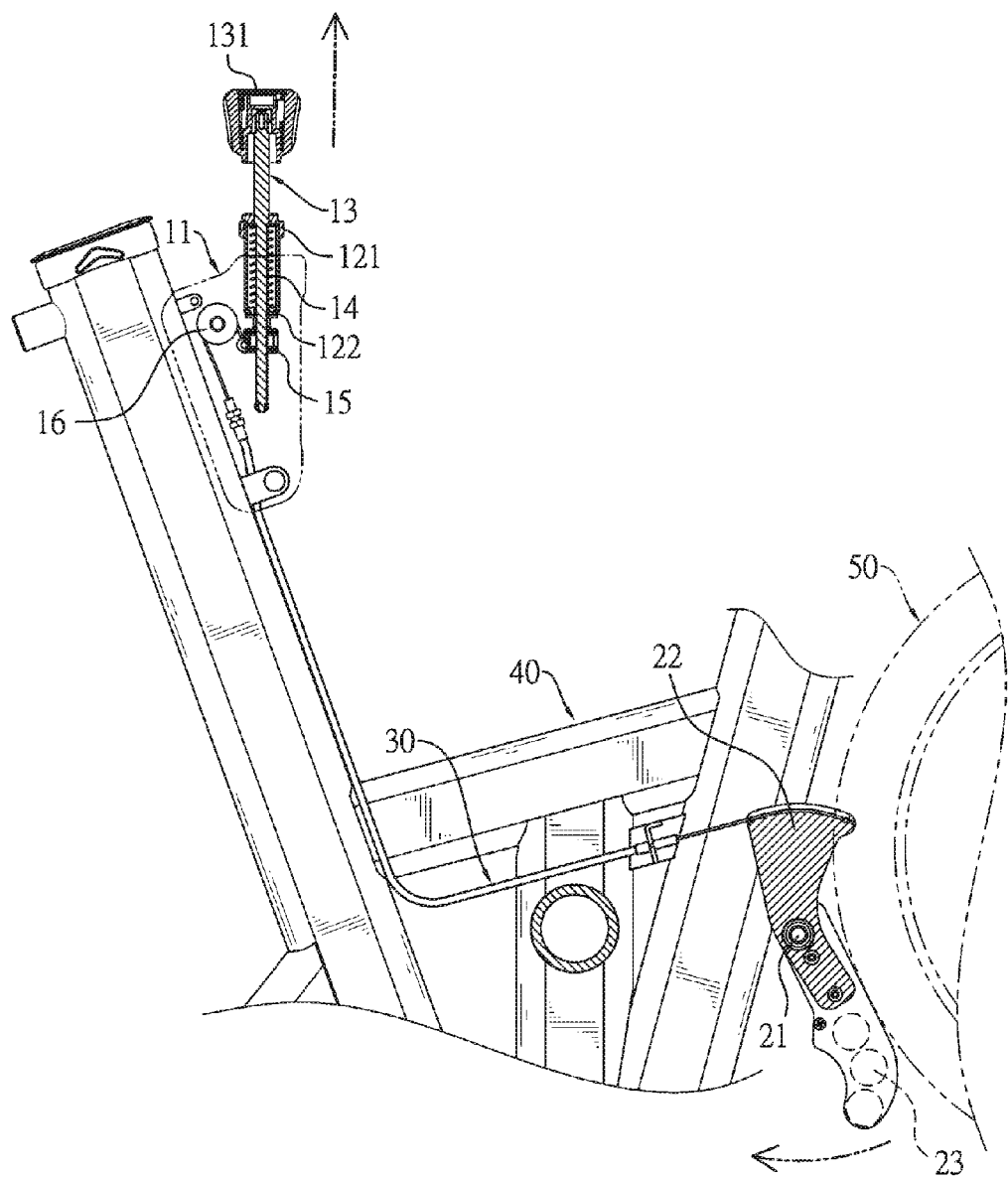
FIG. 3 is a partial side view of the braking device in FIG. 1, showing that the braking device is in an initial position.

With reference to FIGS. 1 and 3, a fitness bike with a braking device in accordance with the present disclosure has an adjusting assembly 10, a braking assembly 20, a wire 30, an abutting element, a frame 40, and a flywheel 50.

The flywheel 50 is rotatably mounted on the frame 40. The flywheel 50 may have a magnetic part.

Figure 2:
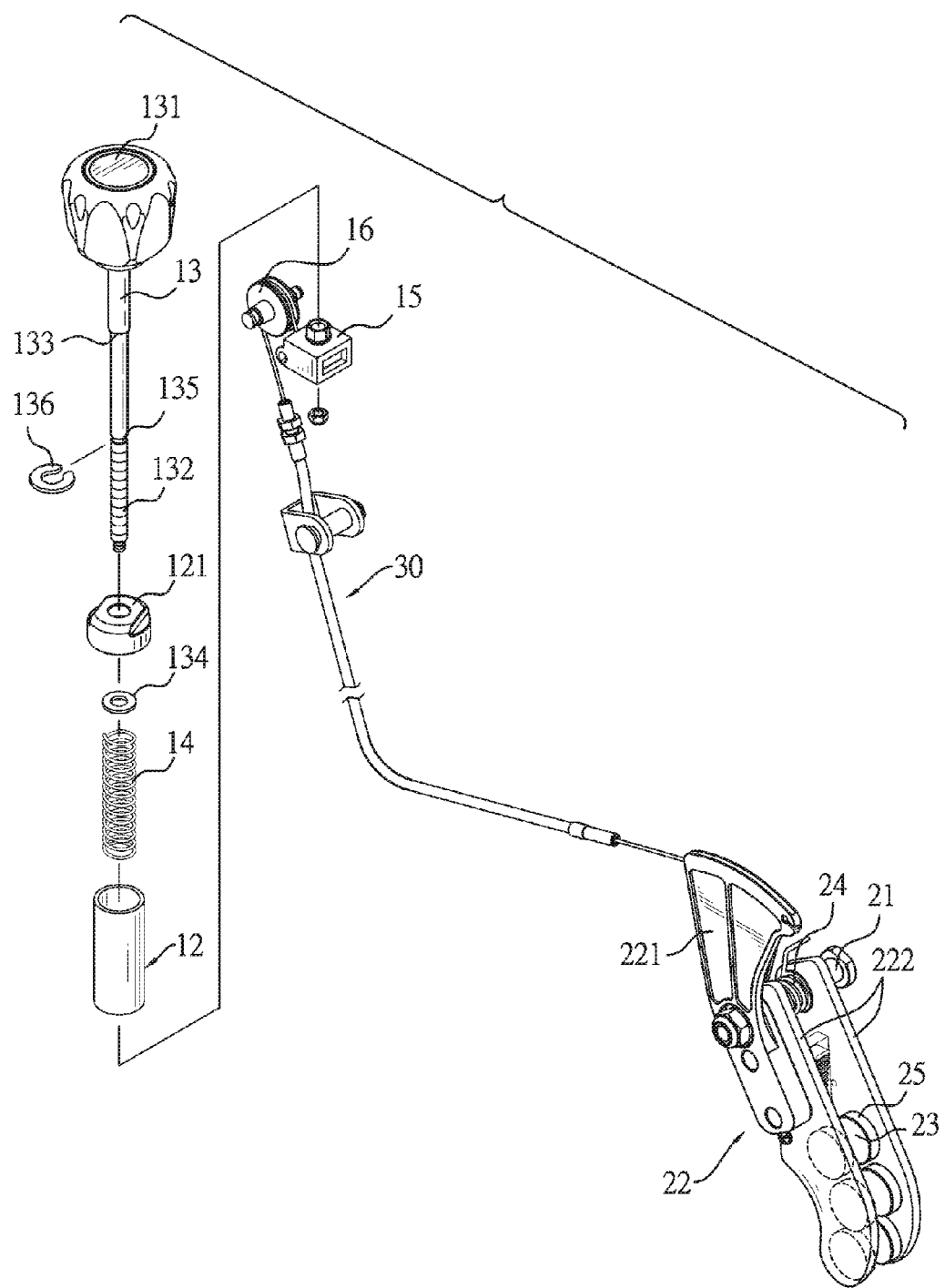
FIG. 2 is an exploded perspective view of the braking device in FIG. 1.

With reference to FIGS. 1 to 3, the adjusting assembly 10 is mounted on the frame 40, and has a main housing 11, a tube 12, a shaft 13, a first resilient member 14, a fine-tuning member 15, and a pulley 16.

The main housing 11 is mounted on the frame 40 and has an inner space.

The tube 12 is mounted in the main housing 11, extends out of the main housing 11, and has an upper cap 121 and a lower cap 122.

The upper cap 121 is mounted on a top end of the tube 12.

The lower cap 122 is mounted on a bottom end of the tube 12.

The shaft 13 is movably mounted in the main housing 11 and the tube 12. Specifically, the shaft 13 is mounted through the upper cap 121 and the lower cap 122, and has a button 131, an outer thread 132, an abutting shoulder 133, a washer 134, an annular groove 135, and a retainer 136.

The button 131 is mounted on the shaft 13 and is located outside the main housing 11.

The outer thread 132 is formed on an outer surface of the shaft 13. Specifically, the outer thread 132 is located in a bottom end of the shaft 13.

The abutting shoulder 133 is formed in the shaft 13 and is located in the tube 12.

The washer 134 is mounted in the abutting shoulder 133.

The annular groove 135 is annularly defined on the outer surface of the shaft 13, is located in a top end of the shaft 13, and is located outside the tube 12.

The retainer 136 may be a C-clip and is mounted in the annular groove 135.

Figure 5:
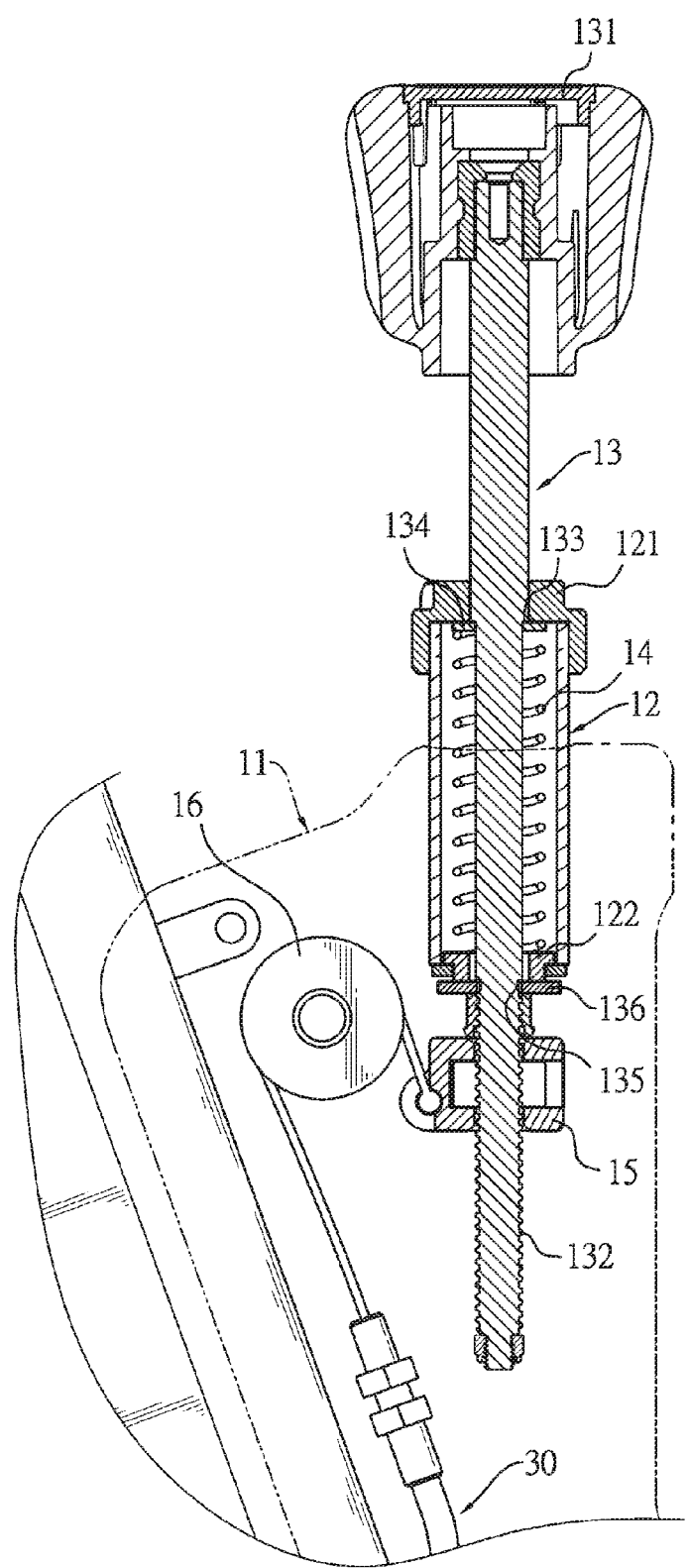
FIG. 5 is an enlarged partial side view of the braking device in FIG. 1.

With reference to FIG. 5, the washer 134 is capable of abutting an upper surface of the upper cap 121. The retainer 136 is capable of abutting a bottom surface of the lower cap 122. Thus, the washer 134 and the retainer 136 limit the tube 12.

With reference to FIGS. 2, 3 and 5, the first resilient member 14 is located in the main housing 11 and receives the shaft 13. The first resilient member 14 is mounted inside the tube 12. A top end of the first resilient member 14 abuts the washer 134 of the shaft 13. A bottom end of the first resilient member 14 abuts the lower cap 122 of the tube 12. The first resilient member 14 abuts and presses the shaft 13 towards an initial position. Specifically, the first resilient member 14 is a spring.

The fine-tuning member 15 has an inner thread, and is located in the main housing 11. The inner thread is formed in the fine-tuning member 15, and engages with the outer thread 132 of the shaft 13.

The pulley 16 is rotatably mounted in the main housing 11.

With reference to FIGS. 1 to 3, the braking assembly 20 is rotatably mounted on the frame 40, is located next to the flywheel 50, and has an axle 21, a linking member 22, an abutting element, a second resilient member 24, and multiple brake pads 25.

The axle 21 is mounted through the frame 40.

The linking member 22 is mounted pivotally on the axle 21, and has a pivoting member 221 and two plates 222.

The pivoting member 221 is rotatably mounted on the axle 21.

The two plates 222 are spaced apart at an interval, are rotatably mounted on the axle 21, and are connected to the pivoting member 221.

The abutting element is mounted in the linking member 22, and rotates with the linking member 22. The abutting element is located next to the flywheel 50, and is capable of abutting a radial outer surface of the flywheel 50.

The abutting element may be a permanent magnet. When the abutting element approaches the flywheel 50, the abutting element attracts the magnetic part of the flywheel 50. Thus, the present disclosure executes braking.

Specifically, the abutting element may have two sets of multiple abutting stubs 23. The two sets of the abutting stubs 23 are mounted respectively on the two plates 222 of the linking member 22 and the abutting stubs 23 of each set are spaced apart at intervals. The abutting stubs 23 are capable of abutting the flywheel 50. Upward pivoting the linking member 22 drives the abutting stubs 23 to abut the flywheel 50. Otherwise, the abutting stubs 23 may be multiple short sticks, which are mounted between the two plates 222 and are spaced apart at intervals.

The second resilient member 24 may be a torsion spring, is mounted on the axle 21, and abuts the linking member 22 to depart from the flywheel 50.

Each of the brake pads 25 is annular and is respectively mounted on an outer surface of the abutting stub 23. Therefore, the brake pad 25 abuts the radial outer surface of the flywheel 50. Each of the brake pads 25 may be wool felt, a leather pad, or a rubber mat.

With reference to FIGS. 1, 2, and 5, the wire 30 is mounted on the frame 40, and is connected to the adjusting assembly 10 and the braking assembly 20. One of two ends of the wire 30 is mounted on the fine-tuning member 15 of the adjusting assembly 10. The other end of the wire 30 is mounted on the linking member 22 of the braking assembly 20. The wire 30 is mounted on the pulley 16 for shifting the moving direction of the wire 30 to upwards or downwards.

When the button 131 is pressed, the shaft 13 is moved downwards. The shaft 13 makes the fine-tuning member 15 pulls the wire 30 downwards. Meanwhile, the wire 30 makes the linking member 22 of the braking assembly 20 rotate towards the flywheel 50.

Figure 4:
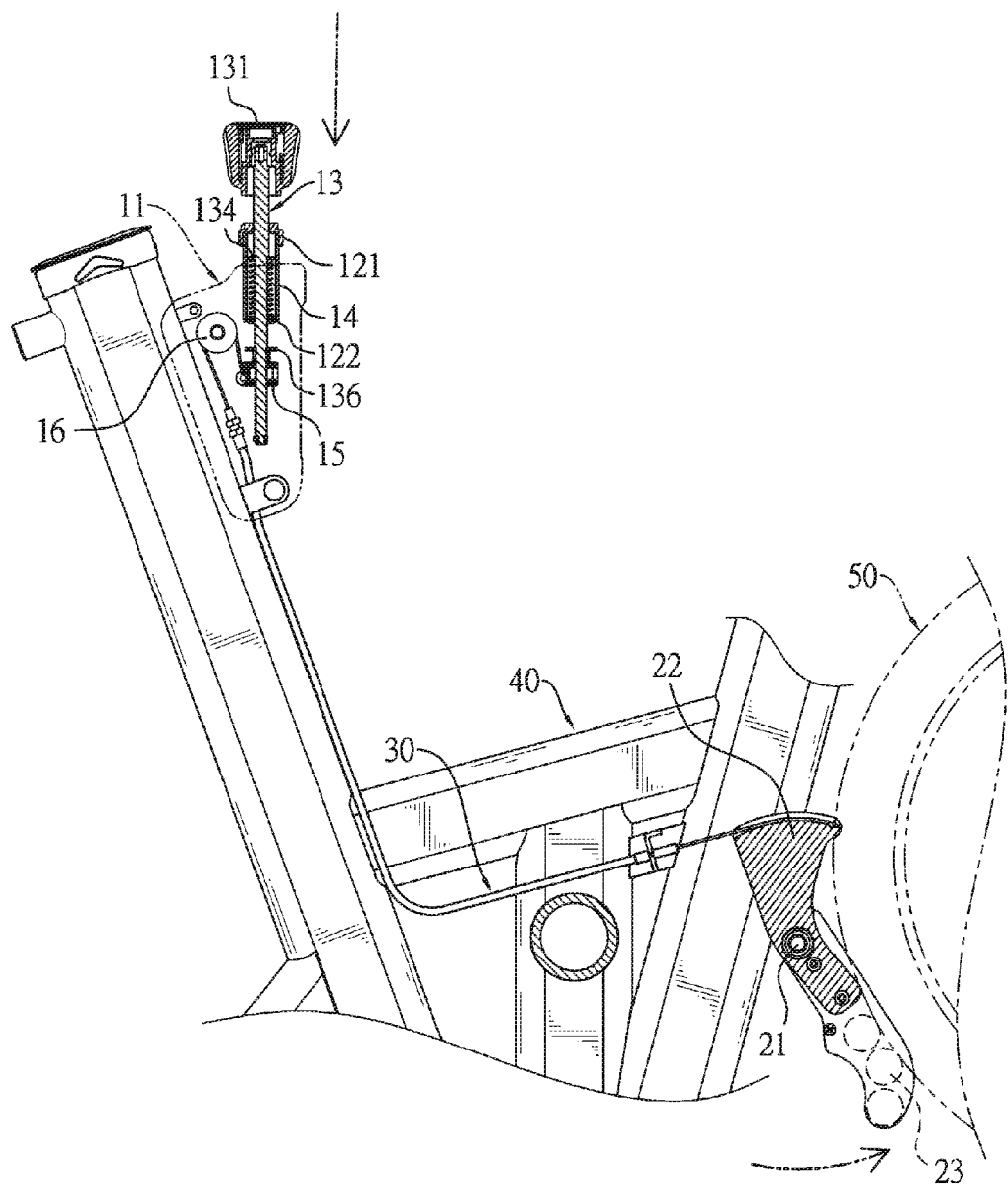
FIG. 4 is another partial side view of the braking device in FIG. 1, showering that the braking device is operated.

With reference to FIGS. 1, 3, and 4, when the button 131 of the shaft 13 is pressed, the shaft 13 and the fine-tuning member 15 move downwards to drive the wire 30. The wire 30 moves downwards along the pulley 16 and drives the braking assembly 20 to rotate. Thus, the abutting element of the braking assembly abuts the flywheel 50 for braking in time. Moreover, when the button 131 is rotated, the shaft 13 is rotated, too. Then, the fine-tuning member 15 moves along the outer thread 132. When the fine-tuning member 15 moves, the fine-tuning member 15 pulls or releases the wire 30 gradually. Thus, the abutting element of the braking assembly 20 approaches or departs from the flywheel 50. Then the brake of the present disclosure is finely adjusted.

The braking assembly of the conventional excise bike has two clamping plates moving in two opposite directions to laterally clamp two side surfaces of the flywheel. Because only one abutting element of the present disclosure radially abuts the outer surface of the flywheel 50, the braking assembly 20 abuts and limits the flywheel 50 in one single direction. Thus, the present disclosure has a simplified structure and is easy to install.

In another embodiment, the present disclosure may not have the pulley 16. Thus, the shaft 13 is laterally and movably mounted through the main housing 11. When the shaft 13 is laterally pushed, the wire 30 is still pulled to dive the braking assembly 20 for braking.

Moreover, the shaft 13 is movably mounted through the main housing 11. When the shaft 13 is pulled upwards, the braking assembly 20 is driven for braking. Thus, the present disclosure may execute braking without the pulley 16.

Even though numerous characteristics and advantages of the present disclosure have been set forth in the foregoing description, together with details of the structure and function of the disclosure, the disclosure is illustrative only. Changes may be made in detail, especially in matters of shape, size, and arrangement of parts within the principles of the disclosure to the full extent indicated by the broad general meaning of the terms in which the appended claims are expressed.

What is claimed is:

1. A fitness bike with a braking device, the fitness bike comprising:
    a frame;
    a flywheel rotatably mounted on the frame;
    an adjusting assembly mounted on the frame, and having
        a main housing mounted on the frame;
        a shaft movably mounted in the main housing and having
            an outer thread formed on an outer surface of the shaft;
        a first resilient member located in the main housing, receiving the shaft, and abutting the shaft; and
        a fine-tuning member located in the main housing, connected to a wire of the fitness bike, and having
            an inner thread formed in the fine-tuning member and engaged with the outer thread of the shaft;
    a braking assembly rotatably mounted on the frame, located next to the flywheel, and having
        an abutting element located next to the flywheel, and being capable of abutting a radial outer surface of the flywheel; and
    the wire mounted on the frame and connected to the adjusting assembly, wherein one of two ends of the wire is mounted on the shaft, and the other end of the wire is mounted on the braking assembly.

2. The fitness bike with a braking device as claimed in claim 1, wherein
    the adjusting assembly further has
        a pulley rotatably mounted in the main housing and mounted to the wire.

3. The fitness bike with a braking device as claimed in claim 1, wherein the adjusting assembly further has
- a tube mounted in the main housing and extending out of the main housing;

the shaft is mounted in the tube, and has
- an abutting shoulder formed in the shaft and located in the tube;
- a washer mounted in the abutting shoulder; and the washer is mounted in the tube, wherein one of two ends of the first resilient member abuts the washer, and the other end of the first resilient member abuts a bottom end of the tube.

4. The fitness bike with a braking device as claimed in claim 3, wherein the shaft has
- an annular groove annularly defined on the outer surface of the shaft and located outside the tube; and
- a retainer mounted in the annular groove, abutted by the fine-tuning member, and being capable of abutting the bottom end of the tube.

5. The fitness bike with a braking device as claimed in claim 1, wherein the abutting element has
- multiple abutting stubs spaced apart at intervals, and being capable of abutting the flywheel.

6. The fitness bike with a braking device as claimed in claim 1, wherein the abutting element is a permanent magnet.

7. The fitness bike with a braking device as claimed in claim 1, wherein the braking assembly has
- a linking member pivotally mounted on the frame and the abutting element, and mounted on the other end of the wire; and
- a second resilient member abutting the linking member.

8. The fitness bike with a braking device as claimed in claim 1, wherein the braking assembly has multiple brake pads mounted on an outer surface of the abutting element.

9. The fitness bike with a braking device as claimed in claim 8, wherein each of the brake pads is wool felt, a leather pad, or a rubber mat.

10. The fitness bike with a braking device as claimed in claim 1, wherein the adjusting assembly further has
- a pulley rotatably mounted in the main housing and mounted to the wire.

11. The fitness bike with a braking device as claimed in claim 1, wherein the abutting element has
- multiple abutting stubs spaced apart at intervals and being capable of abutting the flywheel.

12. The fitness bike with a braking device as claimed in claim 1, wherein the abutting element is a permanent magnet.

13. The fitness bike with a braking device as claimed in claim 1, wherein the braking assembly has
- a linking member pivotally mounted on the frame and the abutting element, and mounted on the other end of the wire; and
- a second resilient member abutting the linking member.

14. The fitness bike with a braking device as claimed in claim 1, wherein the braking assembly has multiple brake pads mounted on an outer surface of the abutting element.

15. The fitness bike with a braking device as claimed in claim 14, wherein each of the brake pads is wool felt, a leather pad, or a rubber mat.

* * * * *